US012089800B2

(12) United States Patent
Takada et al.

(10) Patent No.: US 12,089,800 B2
(45) Date of Patent: Sep. 17, 2024

(54) FLUX SWITCHING MOTOR AND CLEANER USING THE SAME

(71) Applicant: Samsung Electronics Co., Ltd., Suwon-si (KR)

(72) Inventors: Masayuki Takada, Yokohama (JP); Minoru Yoshida, Yokohama (JP); Takashi Kosaka, Nagoya (JP); Yuuki Nakabayashi, Nagoya (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 460 days.

(21) Appl. No.: 17/449,763

(22) Filed: Oct. 1, 2021

(65) Prior Publication Data

US 2022/0015595 A1    Jan. 20, 2022

Related U.S. Application Data

(63) Continuation of application No. PCT/KR2020/004568, filed on Apr. 3, 2020.

(30) Foreign Application Priority Data

Apr. 3, 2019   (JP) .................................. 2019-071170
Apr. 1, 2020   (KR) ......................... 10-2020-0039906

(51) Int. Cl.
*H02K 1/27*   (2022.01)
*A47L 9/22*   (2006.01)
(Continued)

(52) U.S. Cl.
CPC .................. *A47L 9/22* (2013.01); *H02K 1/02* (2013.01); *H02K 1/165* (2013.01); *H02K 1/2713* (2013.01);
(Continued)

(58) Field of Classification Search
CPC ........... A47L 9/22; A47L 9/2842; H02K 1/02; H02K 1/165; H02K 1/223; H02K 1/2713;
(Continued)

(56) References Cited

U.S. PATENT DOCUMENTS

| 4,403,161 A | * | 9/1983 | Miyashita | ............... H02K 1/276 310/156.83 |
| 5,705,970 A | * | 1/1998 | Nishida | .................... H02K 1/02 335/303 |

(Continued)

FOREIGN PATENT DOCUMENTS

| CN | 107104566 A | 8/2017 |
| JP | H06-38472 A | 2/1994 |

(Continued)

OTHER PUBLICATIONS

International Search Report of the International Searching Authority dated Jul. 31, 2020 in connection with International Application No. PCT/KR2020/004568, 5 pages.

(Continued)

*Primary Examiner* — Naishadh N Desai

(57) ABSTRACT

The present disclosure relates to a flux switching motor capable of realizing all a high output, a miniaturization, and an extremely light weight. In the flux switching motor, a stator is provided such that a length thereof in an axial direction in which a rotating shaft extends is shorter than a length of each magnet in the axial direction, and a rotor is provided such that a length thereof in the axial direction is less than or equal to the length of the stator in the axial direction.

16 Claims, 8 Drawing Sheets

(51) Int. Cl.
*H02K 1/02* (2006.01)
*H02K 1/16* (2006.01)
*H02K 1/2713* (2022.01)
*H02K 3/48* (2006.01)
*H02K 5/16* (2006.01)
*H02K 7/00* (2006.01)
*H02K 7/14* (2006.01)

(52) U.S. Cl.
CPC .............. *H02K 3/48* (2013.01); *H02K 5/161* (2013.01); *H02K 7/003* (2013.01); *H02K 7/14* (2013.01)

(58) Field of Classification Search
CPC ........ H02K 11/21; H02K 11/33; H02K 21/44; H02K 2211/03; H02K 3/48; H02K 5/161; H02K 7/003; H02K 7/14
See application file for complete search history.

(56) References Cited

U.S. PATENT DOCUMENTS

| | | | | |
|---|---|---|---|---|
| 6,727,627 B1* | 4/2004 | Sasaki | ................ | H02K 21/46 |
| | | | | 310/156.53 |
| 7,215,059 B1 | 5/2007 | Bitsche et al. | | |
| 7,663,282 B2* | 2/2010 | Ogava | ................ | H02K 21/14 |
| | | | | 310/156.56 |
| 10,250,106 B2* | 4/2019 | Senoo | ................ | H02K 5/203 |
| 11,025,110 B2* | 6/2021 | Li | .................. | H02K 1/28 |
| 11,863,020 B2* | 1/2024 | Nigo | ................ | H02K 21/16 |
| 2005/0174004 A1* | 8/2005 | Takehara | .............. | H01F 41/028 |
| | | | | 310/156.43 |
| 2009/0091198 A1* | 4/2009 | Husband | ................ | H02K 21/44 |
| | | | | 310/46 |
| 2009/0160391 A1 | 6/2009 | Flynn | | |
| 2017/0358976 A1* | 12/2017 | Kelly | ....................... | H02K 1/02 |

FOREIGN PATENT DOCUMENTS

| | | | |
|---|---|---|---|
| JP | 2001-352724 A | 12/2001 |
| JP | 2002-354721 A | 12/2002 |
| JP | 3697633 B2 | 9/2005 |
| JP | 2008-271630 A | 11/2008 |
| JP | 2009-136150 A | 6/2009 |
| JP | 2010-081782 A | 4/2010 |
| JP | 5074350 B2 | 11/2012 |
| JP | 2013-201869 A | 10/2013 |
| JP | 2016-032384 A | 3/2016 |
| JP | 6139007 B2 | 5/2017 |
| JP | 6379436 B2 | 8/2018 |
| JP | 2018-196263 A | 12/2018 |
| JP | 2019-019825 A | 2/2019 |
| KR | 10-2017-0010031 A | 1/2017 |
| KR | 10-2019-0039018 A | 4/2019 |

OTHER PUBLICATIONS

Notice Requesting Submission of Opinion dated Apr. 6, 2024, in connection with Korean Patent Application No. 10-2020-0039906, 23 pages.

* cited by examiner

FLUX SWITCHING MOTOR AND CLEANER USING THE SAME

CROSS-REFERENCE TO RELATED APPLICATIONS

This application is a continuation of International Application No. PCT/KR2020/004568, filed Apr. 3, 2020, which claims priority to Japanese Patent Application No. 2019-071170, filed Apr. 3, 2019, and Korean Patent Application No. 10-2020-0039906, filed Apr. 1, 2020, the disclosures of which are herein incorporated by reference in their entirety.

BACKGROUND

1. Field

The present disclosure relates to a flux switching motor and a cleaner using the same, and more particularly, to a fan motor and a battery-powered cleaner using the flux switching motor.

2. Description of Related Art

As an electric motor which is a type of a conventional rotating electric machine, for example, a flux switching motor as in Patent Document 1 is disclosed.

The flux switching motor of Patent Document 1 includes a rotating shaft, a rotor fixed to the rotating shaft to be rotatable around the rotating shaft, and a stator disposed to face the rotor to surround an outer circumference of the rotor. The stator includes a plurality of stator teeth in which field magnet slots and armature slots are alternately arranged in a circumferential direction around the rotating shaft, a plurality of armature windings wound on a pair of the stator teeth to be fitted into a pair of the armature slots adjacent in the circumferential direction, a plurality of field windings wound around a pair of the stator teeth to be fitted into a pair of the field magnet slots adjacent in the circumferential direction, and a plurality of field magnets accommodated in each of the field magnet slots and arranged such that magnetic pole surfaces of the same polarity face each other in the circumferential direction.

In Patent Document 1, each of the stator teeth is configured such that a front end positioned at an inside side in a radial direction faces a front end of each of rotor teeth of the rotor through an air gap. Each magnet is accommodated in each of the field magnet slots such that an inner end in the radial direction is flush with, that is, parallel to the front end of each of the stator teeth (refer to FIGS. 1 to 4 of Patent Document 1).

Also, FIG. 1 of Patent Document 2 shows a flux switching motor having a configuration similar to that of the flux switching motor of Patent Document 1.

Patent Document

[Patent Document 1] Japanese Patent Laid-Open No. 2016-032384
[Patent Document 2] Japanese Patent Laid-Open No. 2013-201869

SUMMARY

However, recently, a compact and lightweight battery-powered cleaner (especially, a cordless type stick cleaner) is gaining popularity in the market. Because the stick cleaner does not have a power cord and is lightweight, the stick cleaner has been put to practical use as a cleaner with high convenience. On the other hand, because a suction force of a general stick cleaner is lower than that of a cleaner having a power cord, it is difficult to use the general stick cleaner as a main cleaner. Therefore, a high suction force equivalent to that of a cleaner having a power cord is required for the cordless type stick cleaner without impairing compact and light characteristics. Specifically, a fan motor mounted in the stick cleaner is required to have a high output. In order to realize such a request, for example, it may be considered that a fan motor provided with a high-speed rotatable flux switching motor as in Patent Documents 1 and 2 is mounted in the stick cleaner.

In the flux switching motors of Patent Documents 1 and 2, it is preferable to form the air gap as small as possible in order to improve the output. However, very high manufacturing precision is required to form the air gap smaller. Therefore, it is practically difficult to form the air gap extremely small. As a result, in the vicinity of an end of the stator teeth in an axial direction of the rotating shaft (hereinafter referred to as "axial direction") on an inner circumferential side of the stator in the radial direction, a part of a magnetic flux (hereinafter referred to as "magnet flux") generated in the magnet becomes difficult to flow over the air gap and into the rotor teeth. Accordingly, a leakage magnetic flux returning to the end of the stator teeth is generated, and at the same time a leakage magnetic flux returning from the end of the stator teeth to an axial end of the magnet is generated. Therefore, at the same time as the output becomes insufficient, the size of the motor increases as a result.

In addition, in general, the flux switching motor has an iron structure, and among the elements constituting the motor, there are elements that use a relatively large amount of iron. Therefore, it is not easy for the flux switching motor to have an extremely light weight by reducing the amount of iron, which is a component.

As described above, it is not easy for the flux switching motors of Patent Documents 1 and 2 to realize all a high output by torque-up, a miniaturization, and an extremely light weight.

The present disclosure is directed to providing a flux switching motor capable of realizing all a high output, a miniaturization, and an extremely light weight.

In order to achieve the above object, a first embodiment of the present disclosure relates to a flux switching motor, and the flux switching motor includes a rotating shaft, and a rotor including a plurality of rotor teeth rotatable around the rotating shaft. Also, the flux switching motor includes a stator including a plurality of stator teeth provided to face the plurality of rotor teeth through an air gap, respectively, a plurality of armature slots and a plurality of field magnet slots alternately arranged, a plurality of magnets disposed in the plurality of field magnet slots, respectively, and a plurality of armature coils provided to be wound on the armature slots to skip the magnets, respectively. The first embodiment is characterized in that the stator is provided such that a length thereof in an axial direction in which the rotating shaft extends is shorter than a length of the magnet in the axial direction, while the rotor is provided such that a length thereof in the axial direction is less than or equal to the length of the stator in the axial direction.

In the first embodiment, a leakage magnetic flux in the axial direction is reduced in the vicinity of a boundary between the stator and the magnet by an overhang of the magnet with respect to the stator. That is, a loop path of the leakage magnetic flux from an end surface of the stator in the axial direction to an end surface of the magnet in the axial direction is blocked, and a magnetic flux flowing through the stator increases. As a result, the magnetic flux contributing to a high output by torque-up increases. In addition, a gap magnetic flux density of the air gap increases by the overhang of the stator with respect to the rotor to increase a magnetic flux flowing through the rotor, so that the magnetic flux contributing to a high output by torque-up increases. In addition, because the lengths of both the rotor and the stator in the axial direction are shorter than the length of the magnet in the axial direction, the overall size of the motor becomes smaller so that the flux switching motor is miniaturized. In addition, because the sizes of the rotor and the stator are relatively small, a weight of a material (e.g., iron as a magnetic material) constituting the rotor and the stator may be reduced, so that the flux switching motor may become extremely lightweight. Accordingly, the flux switching motor according to the first embodiment may realize all a high output, a miniaturization, and an extreme light weight.

A second embodiment is characterized in that in the first embodiment, the plurality of magnets s accommodated in the plurality of field magnet slots, respectively, and arranged such that magnetic pole surfaces of the same polarity face each other in the circumferential direction, and each of the plurality of magnets is provided such that a first end thereof is disposed on a side close to the rotor in a radial direction with respect to the rotating shaft and a second end thereof is disposed on a side far from the rotor so that a width of the second end in the circumferential direction is formed to be longer than a width of the first end in the circumferential direction.

In the second embodiment, because the width of the second end in the circumferential direction is longer than the width of the first end in the circumferential direction, when the flux switching motor in the axial direction of the rotating shaft is viewed in a plan view, an outer shape of the magnet has a substantially trapezoidal shape in which the front end thereof is narrowed toward a side where the rotor is located. Accordingly, a surface area of a side of the magnet facing the circumferential direction is relatively increased, so that a contact area between the stator and the magnet is increased. As a result, the magnetic flux generated from the magnet may easily flow to the stator. Accordingly, the magnetic flux of the magnet that excites the rotor is increased, so that the output may be further increased.

A third embodiment is characterized in that in the second embodiment, a position of the first end of the magnet in the circumferential direction is disposed such that a distance from the rotor tooth is longer than an end of the stator tooth facing the rotor tooth, and a pellet is formed at an outer edge of the first end.

In the third embodiment, because an amount of the magnet exposed to a fringing magnetic flux generated between the stator teeth and the rotor teeth or a leakage magnetic flux from the stator teeth is reduced so that irreversible demagnetization, that is, decrease in a magnetic force may be suppressed, the output of the motor is stabilized, and at the same time deterioration in performance of the motor may be suppressed. In addition, because an eddy current generated when the fringing magnetic flux passes through the magnet may be similarly reduced, a high efficiency of the motor may also be realized.

A fourth embodiment is characterized in that in any one of the first to the third embodiments, the magnet is formed of an anisotropic Sm—Fe—N bonded magnet configured to contain a resin content of 40% or more by volume percent.

In the fourth embodiment, in the anisotropic Sm—Fe—N bonded magnet configured to contain the resin content of 40% or more by volume percent, the resin content becomes relatively larger while an iron content becomes relatively smaller. Therefore, because an eddy current loss generated in the magnet resulting from the magnet containing iron is reduced, a high increase in efficiency is possible so that the amount of iron, copper, and magnet according to the high increase in efficiency may be reduced. As a result, a light weight may be realized as much as the reduced amount of the materials. Also, a specific gravity (4.5 g/cm3) of the anisotropic Sm—Fe—N bonded magnet is smaller than, for example, a specific gravity (6.5 g/cm3) of an Nd—Fe—B bonded magnet. Accordingly, by applying the anisotropic Sm—Fe—N bonded magnet, for example, as compared with the Nd—Fe—B bonded magnet, the magnetic flux of the magnet having a desired strength is obtained, while the increase in weight of the magnet may be suppressed. Therefore, by applying the anisotropic Sm—Fe—N bonded magnet to the flux switching motor, the motor may become further lightweight.

A fifth embodiment is characterized in that in any one of the first to the fourth embodiments, the flux switching motor is configured to have an outer diameter of 100 mm or less and a height of 50 mm or less.

In the fifth embodiment, the flux switching motor having the outer diameter of 100 mm or less and the height of 50 mm or less may be applied as a component of a fan motor to be mounted on a battery-powered cleaner required to be compact and lightweight and have a high suction power.

A sixth embodiment is characterized in that in any one of the first to the fifth embodiments, the number of the rotor teeth is provided to be an even number, and a difference between the number of the armature slots and the number of the rotor teeth is provided to be an even number.

In the sixth embodiment, as the number of the rotor teeth becomes an even number, and the difference between the number of the armature slots and the number of the rotor teeth also becomes an even number, an eccentric rotation may be prevented. As a result, noise and vibration caused by the motor may be suppressed.

A seventh embodiment is characterized by a fan motor on which the flux switching motor according to any one of the first to the sixth embodiments is mounted.

In the seventh embodiment, the fan motor capable of being applied to a battery-powered cleaner required to be compact and lightweight and have a high suction power may be obtained.

An eighth embodiment is characterized in that in the seventh embodiment, the fan motor is configured to have a suction power of 250 W or more.

In the eighth embodiment, because the suction power of the fan motor is 250 W or more, the fan motor may be applied to the battery-powered cleaner required to have a high suction power.

A ninth embodiment is characterized by a battery-powered cleaner on which the fan motor according to the seventh or eighth embodiment is mounted.

In the ninth embodiment, a battery-powered cleaner capable of being compact and lightweight, and having a high suction power may be obtained.

According to the present disclosure, a flux switching motor capable of realizing all a high output, a miniaturization, and an extremely light weight can be provided.

DETAILED DESCRIPTION

Hereinafter, embodiments of the present disclosure will be described in detail with reference to the accompanying drawings. The description of the following embodiments is merely illustrative in nature, and is not intended to limit the present disclosure, its application, or its use.

(Fan Motor)

Figure 1:
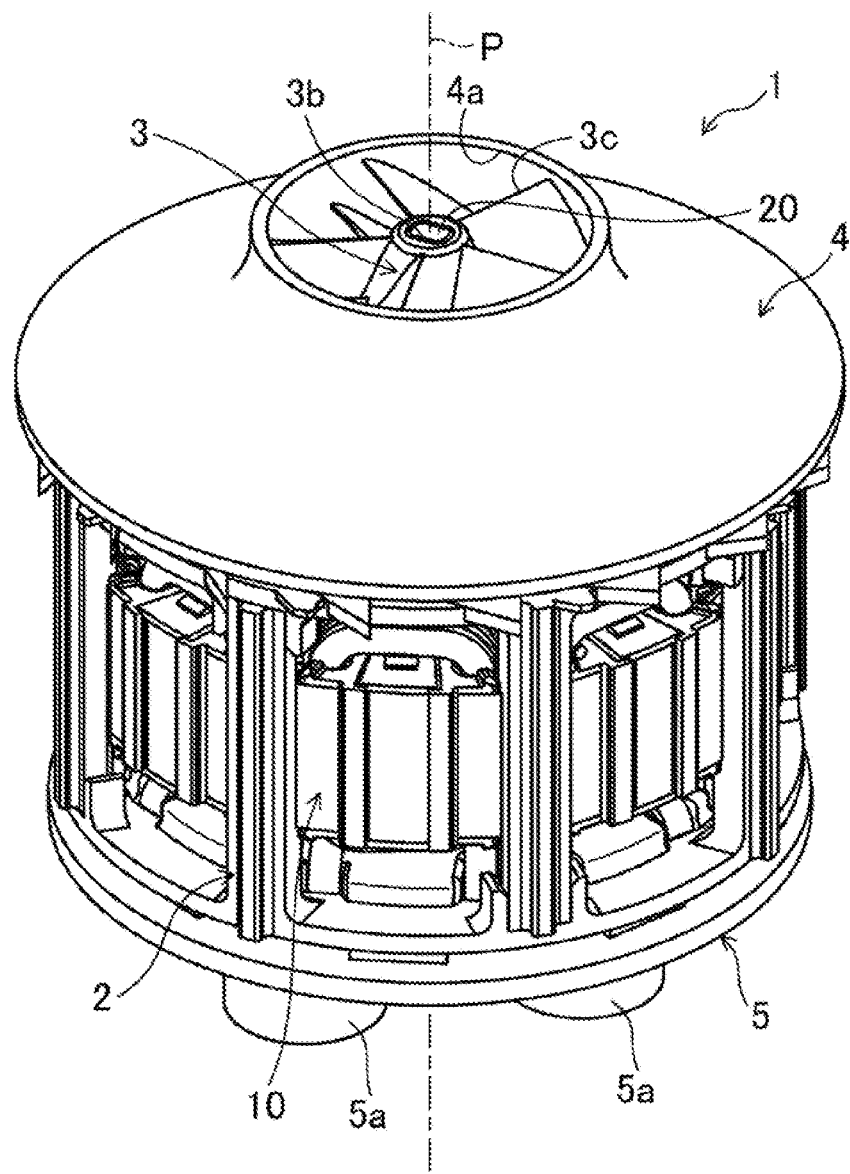
FIG. 1 is a perspective view illustrating an entire fan motor according to an embodiment.

FIG. 1 is a perspective view illustrating an entire fan motor 1 including a flux switching motor 10 according to an embodiment of the present disclosure. The fan motor 1 is mainly mounted in a battery-powered cleaner (not shown) such as a cordless type stick cleaner. The flux switching motor 10 according to the present embodiment is configured as an inner rotor type flux switching motor.

In the following description, as a side where a fan cover 4, which will be described later, is located is referred to as an upper side, and a side where a wiring board 5, which will be described later, is located is referred to as a lower side, a location relationship between the fan motor 1 and the flux switching motor 10 in a vertical direction (corresponding to an axial direction P of a rotating shaft 20, which will be described later) will be defined. This positional relationship is independent of an actual vertical direction of the battery-powered cleaner in which the fan motor 1 is mounted.

Figure 2:
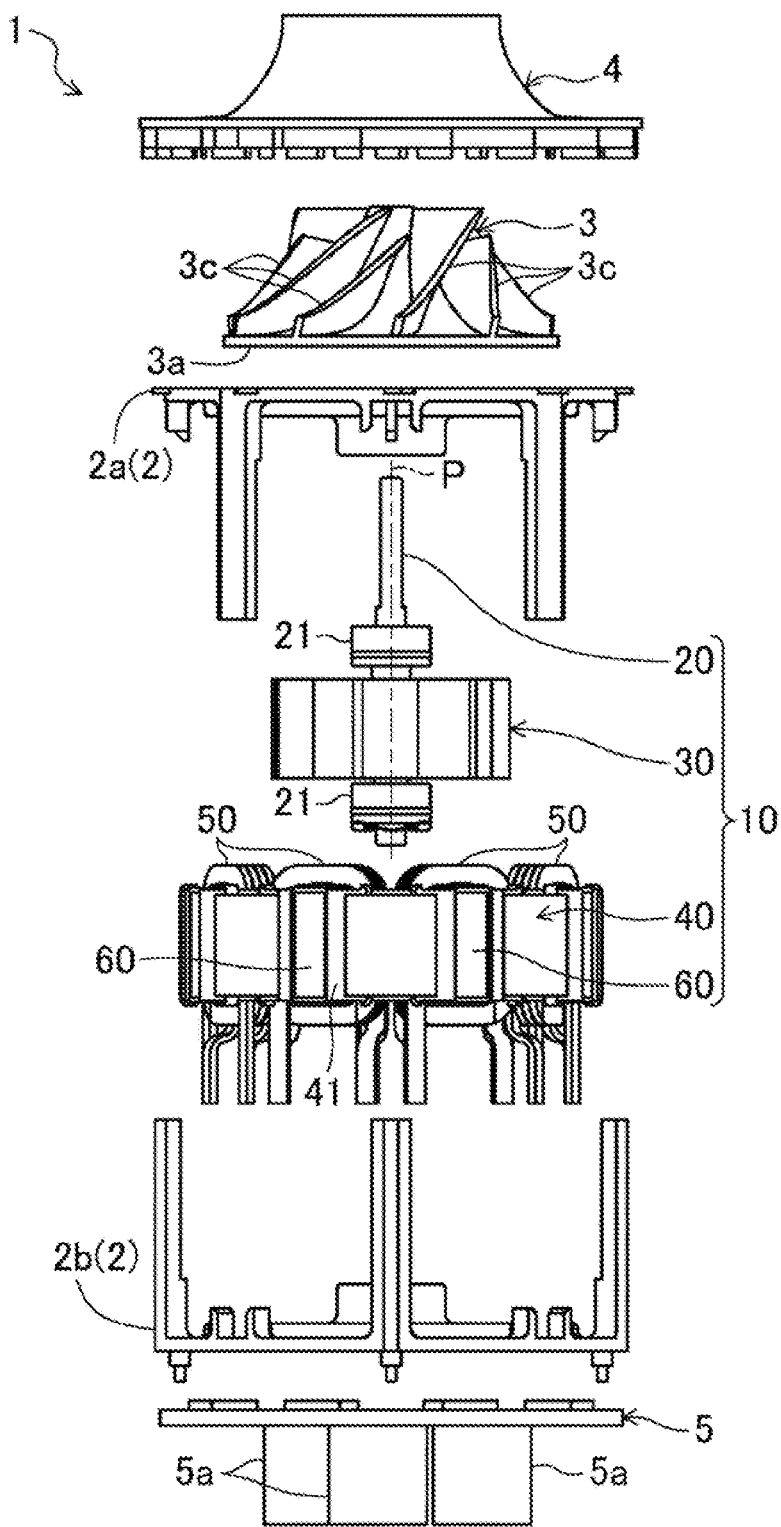
FIG. 2 is an exploded perspective view illustrating each configuration of the fan motor.

As illustrated in FIGS. 1 and 2, the fan motor 1 includes a housing 2, an impeller 3, the fan cover 4, the wiring board 5, and a flux switching motor 10. In the present embodiment, the fan motor 1 preferably has a suction power of 250 W or more.

The housing 2 includes a first housing 2a and a second housing 2b. The first housing 2a is disposed above the flux switching motor 10. On the other hand, the second housing 2b is disposed below the flux switching motor 10. Accordingly, the housing 2 is configured to entirely cover the flux switching motor 10 in a state where the first housing 2a and the second housing 2b are coupled to each other.

The impeller 3 is disposed above the first housing 2a. The impeller 3 includes a main body 3a. The main body 3a is formed in a substantially conical shape. When the main body 3a is viewed in a plan view, a coupling hole 3b for allowing the rotating shaft 20, which will be described later, to be coupled is formed substantially in the center thereof. A plurality of wing portions 3c is provided on an outer circumferential surface of the main body 3a.

The fan cover 4 is disposed above the first housing 2a to cover the impeller 3 from above. When the fan cover 4 is viewed in a plan view, an intake port 4a that is open in a substantially circular shape in the vertical direction is formed in the center thereof.

The wiring board 5 is disposed below the second housing 2b. The wiring board 5 is electrically connected to each of armature coils 50, which will be described later, constituting the flux switching motor 10. Condensers 5a are provided below the wiring board 5. In addition, a control circuit (not shown) provided to detect a position of each of rotor teeth 33 and also to perform control of A-phase coils 51 and B-phase coils 52, which will be described later, in an energized state is provided on the wiring board 5.

(Flux Switching Motor)

The flux switching motor 10 is, for example, a flux switching motor by two-phase alternating current. The flux switching motor 10 is configured to have an outer diameter of 100 mm or less and an overall height of 50 mm or less.

(Rotating Shaft)

Figure 3:
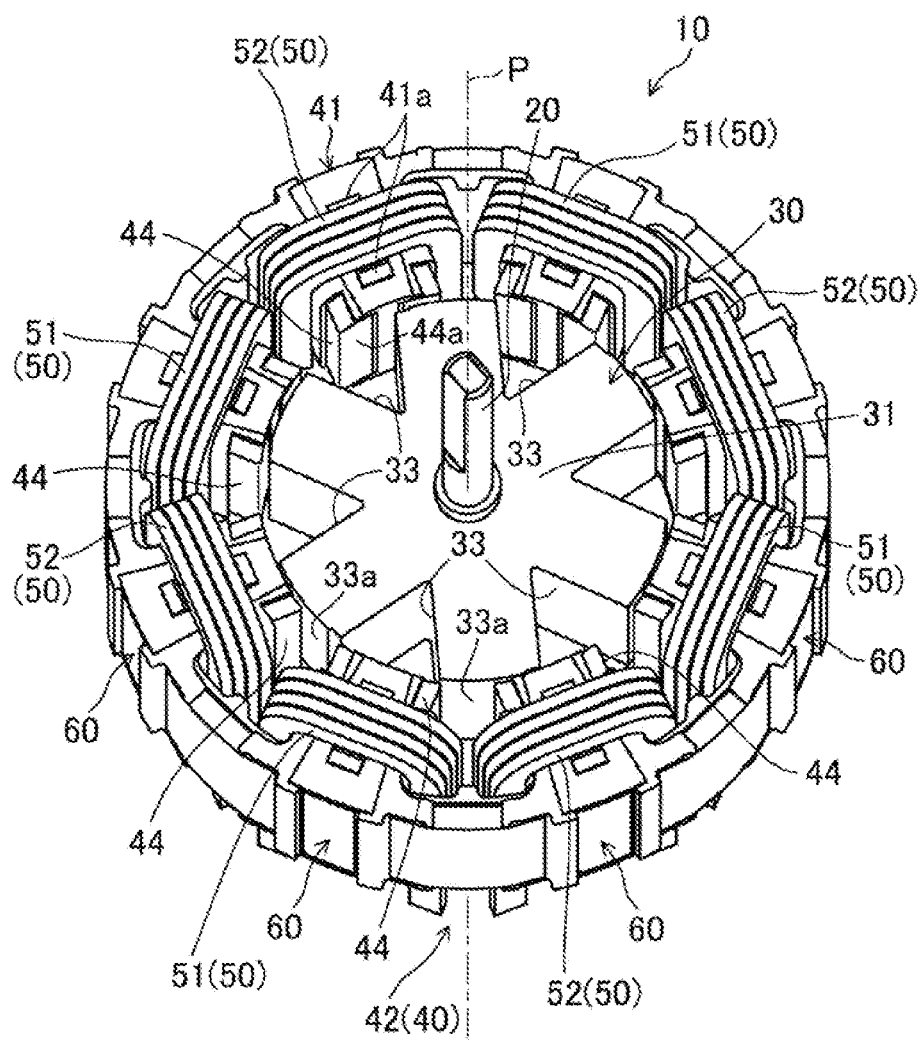
FIG. 3 is a perspective view illustrating an entire flux switching motor.

As illustrated in FIGS. 1 to 3, the flux switching motor 10 includes the rotating shaft 20. The rotating shaft 20 is formed to extend along a direction of an alternated long and short dash line indicated by a symbol P (hereinafter referred to as "axial direction P"). The rotating shaft 20 is fixed to a rotor 30 in a state of being inserted into a hole 32 of the rotor 30, which will be described later.

As illustrated in FIG. 2, bearings 21 and 21 are provided on the rotating shaft 20. The bearings 21 are disposed above and below the rotor 30, respectively.

(Rotor)

As illustrated in FIG. 2, the flux switching motor 10 includes the rotor 30. The rotor 30 is formed of a magnetic material such as iron. The rotor 30 is configured to be rotatable in a circumferential direction of the rotating shaft 20 (hereinafter referred to as "circumferential direction") around the rotating shaft 20.

As illustrated in FIGS. 3 to 7, the rotor 30 includes a yoke portion 31, the hole 32, and the plurality of rotor teeth 33

The hole 32 is formed in the center when the yoke portion 31 is viewed in a plan view, and penetrates in the axial direction P. The yoke portion 31 is fixed to the rotating shaft 20 in a state in which the rotating shaft 20 is inserted into the hole 32.

Each of the rotor teeth 33 is formed integrally with, for example, the yoke portion 31, and protrudes outward from the yoke portion 31 in a radial direction (hereinafter referred to as "radial direction") around the rotating shaft 20. The rotor teeth 33 are provided with an even number (six in an illustrated example). In addition, a difference between the number of armature slots 46, which will be described later, and the number of the rotor teeth 33 becomes an even number.

The rotor teeth 33 are arranged at intervals in the circumferential direction. Specifically, the rotor teeth 33 are arranged at regular intervals in the circumferential direction so that each interval forms an angle of 60 degrees.

(Stator)

As illustrated in FIG. 2, the flux switching motor 10 includes a stator 40. The stator 40 is formed of a magnetic material such as iron. The stator 40 is disposed oppositely to surround an outer circumference of the rotor 30.

Figure 4:
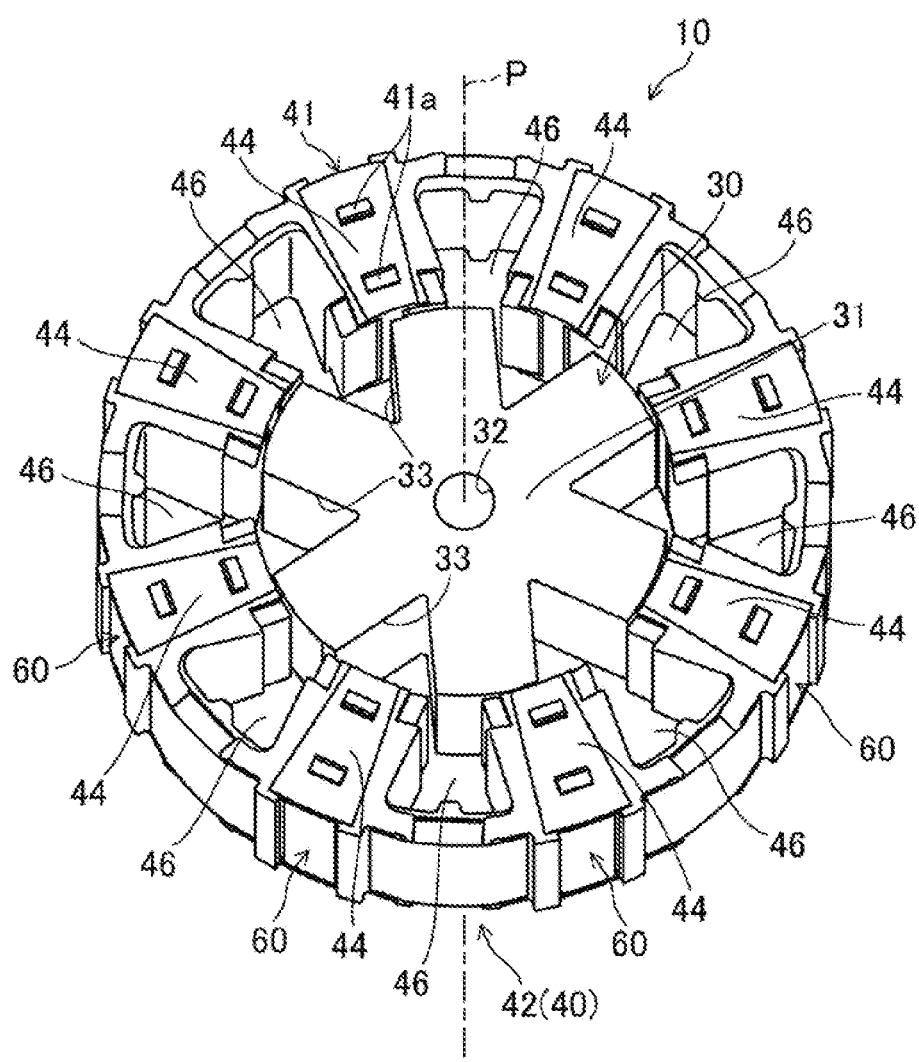
FIG. 4 is a perspective view illustrating the configuration of the flux switching motor illustrated in FIG. 3 in which a rotating shaft and an armature coil are removed.

As illustrated in FIGS. 3 and 4, the stator 40 includes a stator core 42. A holder member 41 is provided on the stator core 42. The stator core 42 is configured to have a substantially circular annular shape when split stators 43, which will be described later, are viewed in a plan view in a state of being coupled to the holder member 41. A fork portion 41*a* provided to hold each of the armature coils 50, which will be described later, on each of stator teeth 44 is formed on an upper surface of the holder member 41.

Figure 5:
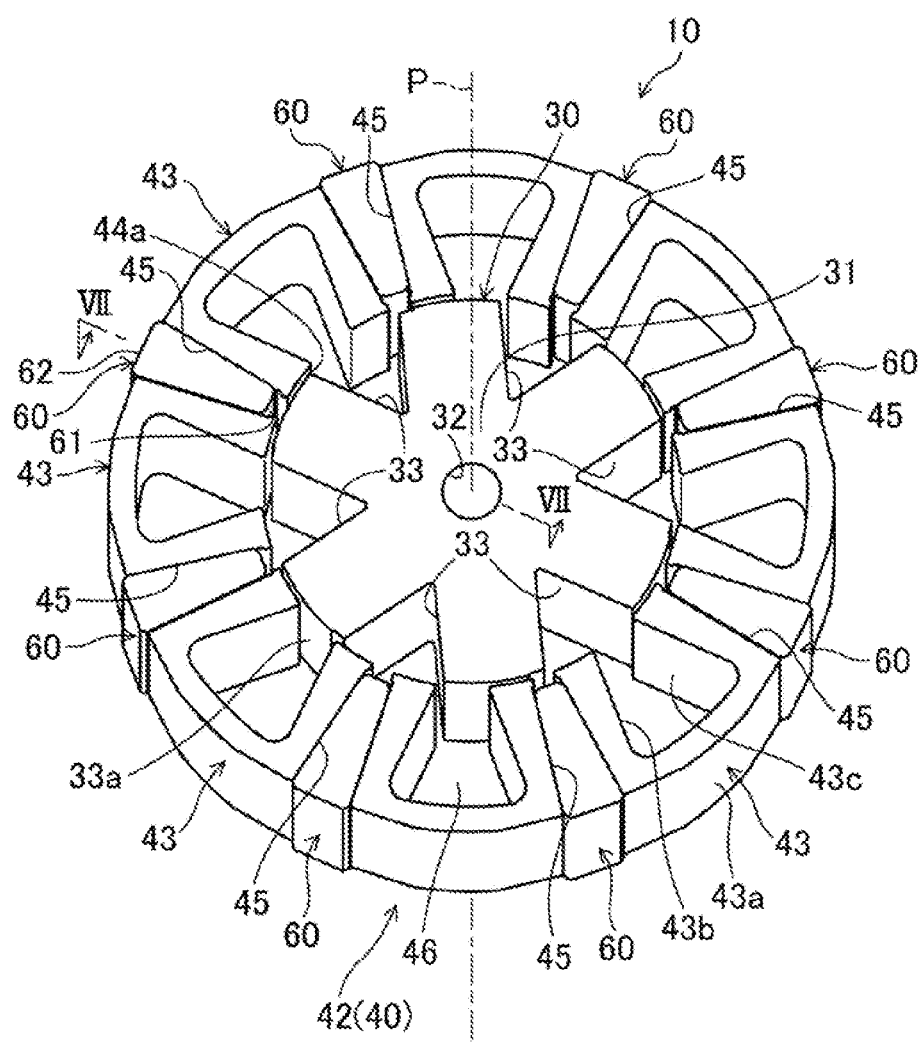
FIG. 5 is a perspective view illustrating the configuration of the flux switching motor illustrated in FIG. 4 in which a holder member is removed.
Figure 6:
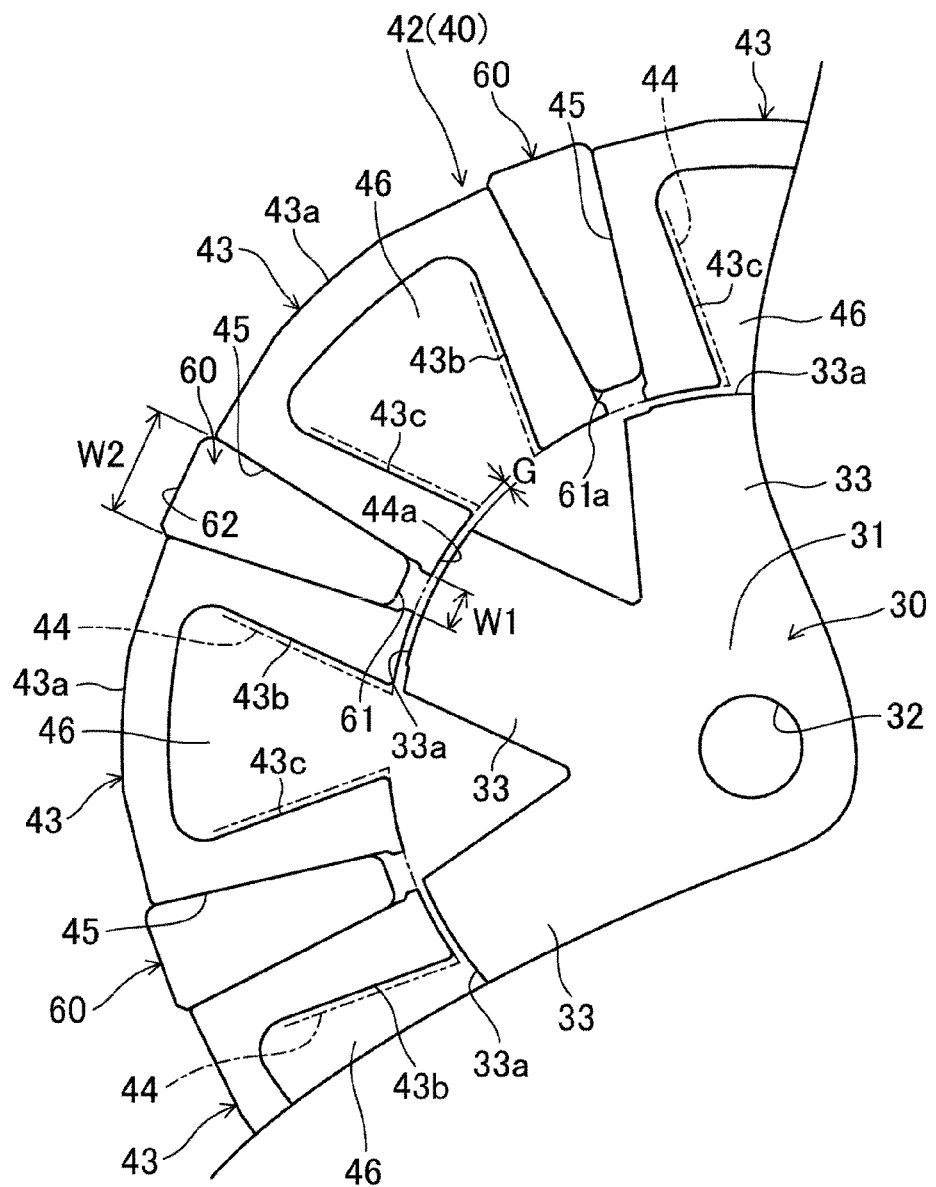
FIG. 6 is a partially enlarged plan view illustrating an enlarged left part of the configuration illustrated in FIG. 5.

As illustrated in FIGS. 5 and 6, the stator core 42 is configured as the plurality of split stators 43 (eight in an illustrated example). Each of the split stators 43 is formed in a substantially C-shape when viewed from a plan view. Each of the split stators 43 includes a yoke portion 43*a* and a pair of protrusions 43*b* and 43*c*.

The yoke portion 43*a* is disposed radially outward (that is, opposite to a side where each of the rotor teeth 33 is located). The yoke portion 43*a* is curved such that an outer circumferential surface thereof faces an outer circumferential direction of the stator core 42. Each of the protrusions 43*b* and 43*c* protrudes radially inward from an end of the yoke portion 43*a* in the circumferential direction.

As illustrated in FIGS. 3 and 4, the stator 40 is provided with the plurality of stator teeth 44. Each of the stator teeth 44 protrudes from an outer side to an inner side in the radial direction. The stator teeth 44 are arranged at intervals in the circumferential direction. In the present embodiment, each of the stator teeth 44 is configured such that the protrusion 43*b* of the split stator 43 on one side, and the protrusion 43*c* of the split stator 43 on the other side, which faces the protrusion 43*b* in the circumferential direction, form a pair.

Figure 7:
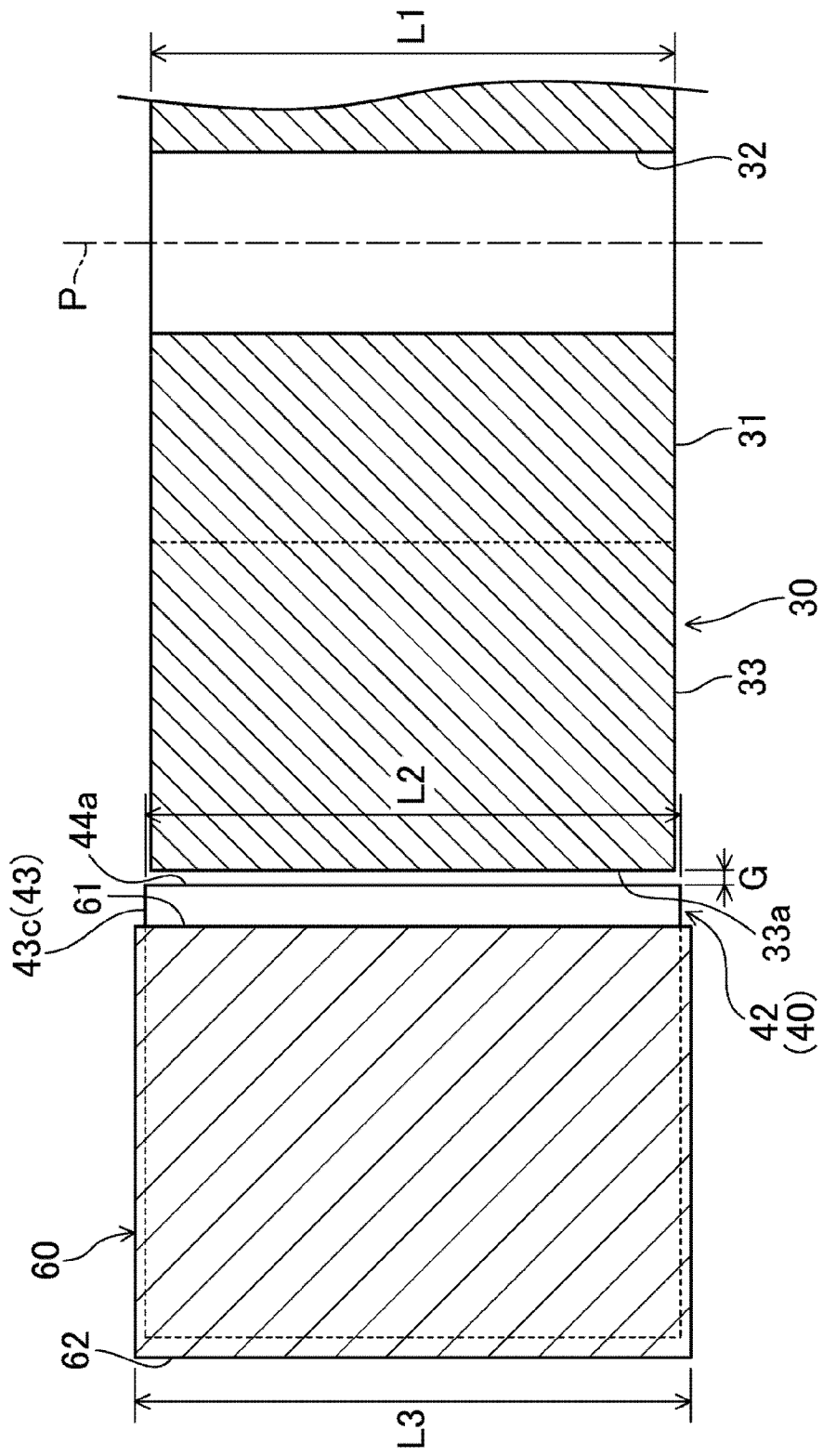
FIG. 7 is a cross-sectional view taken along line VII-VII in FIG. 6.

As illustrated in FIGS. 6 and 7, each of the stator teeth 44 is formed such that a front end 44*a* positioned an inner side in the radial direction faces a front end 33*a* of each of the rotor teeth 33 through an air gap G. That is, each of the stator teeth 44 is disposed such that the front end 44*a* is not in contact with the front end 33*a* of each of the rotor teeth 33. The air gap G enables transmission of magnetic flux between each of the stator teeth 44 and each of the rotor teeth 33.

As illustrated in FIGS. 5 and 6, the stator 40 is provided with a plurality of field magnet slots 45. Each of the field magnet slots 45 is formed at a substantially central position in the circumferential direction of each of the stator teeth 44. Specifically, each of the field magnet slots 45 is configured as a space portion positioned between the protrusion 43*b* of the split stator 43 on one side and the protrusion 43*c* of the split stator 43 on the other side facing the protrusion 43*b* in the circumferential direction.

As illustrated in FIGS. 4 and 6, the stator 40 is provided with the plurality of armature slots 46. Each of the armature slots 46 is disposed between the stator teeth 44 adjacent in the circumferential direction. Specifically, each of the armature slots 46 is configured as a space portion positioned between the protrusions 43*b* and 43*c* in one of the split stator 43. Also, each of the armature slots 46 is alternately arranged with each of the field magnet slots 45 in the circumferential direction.

The present embodiment provides a two-phase motor having a 6-pole pair, that is, 12 poles because the number of the rotor teeth 33 is six and having a fractional slot configuration because the number of the armature slots 46 is eight, both the number of the rotor teeth 33 and the number of the armature slots 46 becomes an even number, and the difference also becomes an even number.

(Armature Coil)

As illustrated in FIGS. 2 and 3, the flux switching motor 10 includes the plurality of armature coils 50. Each of the armature coils 50 is formed of a flat wire and is wound edgewise. Also, the armature coil 50 is configured to form a magnetic field (hereinafter referred to as a "rotating magnetic field") for rotationally driving the rotor 30. Specifically, the rotating magnetic field is formed by supplying two-phase alternating current to each of the armature coils 50, and this rotating magnetic field is generated at the front end 44*a* of each of the stator teeth 44.

The plurality of armature coils 50 is provided on the stator 40. Specifically, each of the armature coils 50 is wound on each of the stator teeth 44 to skip and wrap each of the field magnet slots 45 positioned between a pair of the armature slots 46 adjacent in the circumferential direction.

The armature coil 50 includes the plurality of A-phase coils 51 (four in the illustrated example) and the plurality of B-phase coils 52 (four in the illustrated example). The phase A coils 51 and the phase B coils 52 are alternately arranged in the circumferential direction.

In the present embodiment, the A-phase coil 51 is wound in a clockwise direction, and the B-phase coil 52 adjacent to this A-phase coil 51 is also wound in the clockwise direction. The A-phase coil 51 adjacent to the B-phase coil 52 wound in the clockwise direction is wound in a counterclockwise direction, and the B-phase coil 52 adjacent to this A-phase coil 51 is also wound in the counterclockwise direction. In addition, the A-phase coil 51 adjacent to the B-phase coil 52 wound in the counterclockwise direction is wound in the clockwise direction, and the B-phase coil 52 adjacent to this A-phase coil 51 is also wound in the clockwise direction.

(Magnet)

The stator 40 includes a plurality of magnets 60 (eight in the illustrated example) for fielding the rotor 30. Each of the magnets 60 is accommodated in each of the field magnet slots 45. Each of the magnets 60 is formed of an anisotropic Sm—Fe—N bonded magnet configured to contain a resin content of 40% or more by volume percent.

For example, when an alternating current flows through the A-phase coils 51, each of the stator teeth 44 on which each of the phase A coils 51 is wound becomes an electromagnet to attract the rotor teeth 33 located in the vicinity of the stator teeth 44.

The magnet 60 includes a first end 61 and a second end 62.

The first end 61 is formed to be positioned radially outward from the front end 44*a* of each of the stator teeth 44 (opposite the side where each of the rotor teeth 33 is located) in a state in which each of the magnets 60 is accommodated in each of the field magnet slots 45. That is, each of the magnets 60 is positioned radially outward from the front end 44*a* of each of the stator teeth 44 when viewed in a plan view. In other words, each of the magnets 60 is accommodated in each of the field magnet slots 45 so that the first end 61 is not in contact with the front end 44*a* of each of the stator teeth 44.

The first end 61 is positioned such that a distance from the rotor tooth 33 in the circumferential direction is longer than the front end 44*a* of the stator tooth 44 facing the rotor tooth 33. An outer edge of the first end 61 is provided with a pellet 61*a*, that is, is rounded.

The second end 62 is formed to be positioned radially outward from the first end 61 (opposite to the side where each of the rotor teeth 33 is positioned).

The magnets 60 adjacent in the circumferential direction are arranged such that magnetic pole surfaces of the same polarity face each other in the circumferential direction. Accordingly, the magnets 60 adjacent in the circumferential direction are arranged such that the one magnet 60 repels the other magnet 60.

Each of the magnets 60 is formed such that an end thereof is narrowed from the outside toward the inside in the radial direction when viewed in a plan view. Specifically, as illustrated in FIG. 6, each of the magnets 60 is formed such that a width of the second end 62 in the circumferential direction (dimension W2 illustrated in FIG. 6) is larger than a width of the first end 61 (dimension W1 illustrated in FIG. 6) in the circumferential direction.

Characteristic Configuration of the Embodiment

As a feature of the present embodiment, as illustrated in FIG. 7, the stator 40 is configured such that a length thereof in an axial direction P (dimension L2 illustrated in FIG. 7) is shorter than a length of the magnet 60 in the axial direction P (dimension L3 illustrated in FIG. 7). Specifically, each of the split stators 43 is formed such that in a paper surface of FIG. 7, an upper end thereof is located below an upper end of the magnet 60 and a lower end thereof is located above a lower end of the magnet 60.

The rotor 30 is configured such that a length thereof in the axial direction (dimension L1 illustrated in FIG. 7) is shorter than the length L2 of the stator 40 in the axial direction P. Specifically, the rotor 30 is formed such that in the paper surface of FIG. 7, an upper end thereof is located below an upper end of the stator 40 and a lower end thereof is located above a lower end of the stator 40.

Effects of the Embodiment

As described above, in the present embodiment, the stator 40 is configured such that the length in the axial direction P from the rotating shaft 20 is shorter than the length in the axial direction P from the magnet 60, while the rotor 30 is configured such that the length in the axial direction P is equal to or less than the length in the axial direction P from the stator. In this configuration, a leakage magnetic flux in the axial direction P is reduced in the vicinity of a boundary between the stator 40 and the magnet 60 by an overhang of the magnet 60 with respect to the stator 40. That is, a loop path of the leakage magnetic flux from an end surface of the stator 40 in the axial direction P to an end surface of the magnet 60 in the axial direction P is blocked, and a magnetic flux flowing through the stator 40 increases. As a result, the magnetic flux contributing to a high output by torque-up increases. In addition, a gap magnetic flux density of the air gap G increases by the overhang of the stator 40 with respect to the rotor 30 to increase a magnetic flux flowing through the rotor 30, so that the magnetic flux contributing to a high output by torque-up increases. In addition, because the lengths of both the rotor 30 and the stator 40 in the axial direction P are shorter than the length of the magnet 60 in the axial direction P, the overall size of the motor becomes smaller so that the flux switching motor 10 is miniaturized. In addition, because the sizes of the rotor 30 and the stator 40 are relatively small, a weight of a material (e.g., iron as a magnetic material) constituting the rotor 30 and the stator 40 may be reduced, so that the flux switching motor 10 may become extremely lightweight. Accordingly, the flux switching motor 10 according to the present embodiment may realize all a high output, a miniaturization, and an extreme light weight.

In addition, each of the plurality of magnets 60 is accommodated in each of the field magnet slots 45 and arranged such that the magnetic pole surfaces of the same polarity face each other in the circumferential direction. In other words, the polarity of the magnets 60 on opposing sides of the rotating shaft 20 is the same. and each of the plurality of magnets 60 is provided such that the first end 61 is disposed on a side close to the rotor 30 in the radial direction with respect to the rotating shaft 20 and the second end 62 is disposed on a side far from the rotor 30 so that the width of the second end 62 in the circumferential direction is formed to be longer than the width of the first end 61 in the circumferential direction. That is, when the flux switching motor 10 in the axial direction of the rotating shaft 20 is viewed in a plan view, an outer shape of the magnet 60 has a substantially trapezoidal shape in which the front end thereof is narrowed toward a side where the rotor 30 is located. Accordingly, a surface area of a side of the magnet 60 facing the circumferential direction is relatively increased, so that a contact area between the stator 40 and the magnet 60 is increased. As a result, the magnetic flux generated from the magnet 60 may easily flow to the stator 40. Accordingly, the magnetic flux of the magnet that excites the rotor 30 is increased, so that the output may be further increased.

In addition, the position of the first end 61 of the magnet 60 in the circumferential direction is arranged such that the distance from the rotor tooth 33 is longer than from the end of the stator tooth 44 facing the rotor tooth 33, and the pellet 61a is provided at the outer edge of the first end 61. Accordingly, because an amount of the magnet 60 exposed to a fringing magnetic flux generated between the stator teeth 44 and the rotor teeth 33 or a leakage magnetic flux from the stator teeth 44 is reduced so that irreversible demagnetization, that is, decrease in a magnetic force may be suppressed, the output of the flux switching motor 10 is stabilized, and at the same time deterioration in performance of the flux switching motor 10 may be suppressed. In addition, because an eddy current generated when the fringing magnetic flux passes through the magnet 60 may be similarly reduced, a high efficiency of the flux switching motor 10 may also be realized.

In addition, in the anisotropic Sm—Fe—N bonded magnet configured to contain the resin content of 40% or more by volume percent, the resin content is relatively large while an iron content is relatively small. Therefore, because an eddy current loss generated in the magnet 60 resulting from the magnet 60 containing iron is reduced, a high increase in efficiency is possible so that the amount of iron, copper, and magnet according to the high increase in efficiency may be reduced.

As a result, the weight may be reduced as much as the reduced amount of the materials. Also, a specific gravity (4.5 g/cm3) of the anisotropic Sm—Fe—N bonded magnet is smaller than, for example, a specific gravity (6.5 g/cm3) of an Nd—Fe—B bonded magnet. Accordingly, by applying the anisotropic Sm—Fe—N bonded magnet, for example, as compared with the Nd—Fe—B bonded magnet, the magnetic flux of the magnet having a desired strength is obtained, while the increase in weight of the magnet 60 may be suppressed. Therefore, by applying the anisotropic Sm—Fe—N bonded magnet to the flux switching motor 10, the motor may become further lightweight.

In addition, in the present embodiment, the flux switching motor 10 having an outer diameter of 100 mm or less and a height of 50 mm or less may be applied as a component of the fan motor 1 to be mounted on a battery-powered cleaner required to be compact and lightweight and have a high suction power.

In addition, in the present embodiment, as the number of the rotor teeth 33 becomes an even number, and the difference between the number of the armature slots 46 and the number of the rotor teeth 33 also becomes an even number, an eccentric rotation may be prevented. As a result, noise and vibration caused by the motor may be suppressed.

In addition, in the present embodiment, the fan motor 1 capable of being applied to a battery-powered cleaner required to be compact and lightweight and have a high suction power may be obtained.

In addition, in the present embodiment, because the suction power of the fan motor 1 is 250 W or more, the fan motor 1 may be applied to a battery-powered cleaner required to have a high suction power.

Therefore, a battery-powered cleaner provided with the fan motor 1 according to the present embodiment may become compact and lightweight, and may also have a high suction power.

Modified Examples of the Embodiment

The above embodiment illustrates the flux switching motor 10 configured by a two-phase alternating current, but is not limited thereto. For example, the flux switching motor 10 may be configured by a single-phase alternating current as in a modified example illustrated in FIG. 8. Specifically, in this modified example, the configurations of the rotor 30 and the armature coils 50 is partially different from those in the above embodiment. However, because other configurations in this modified example are the same as those in the above embodiment, a detailed description thereof will be omitted.

Figure 8:
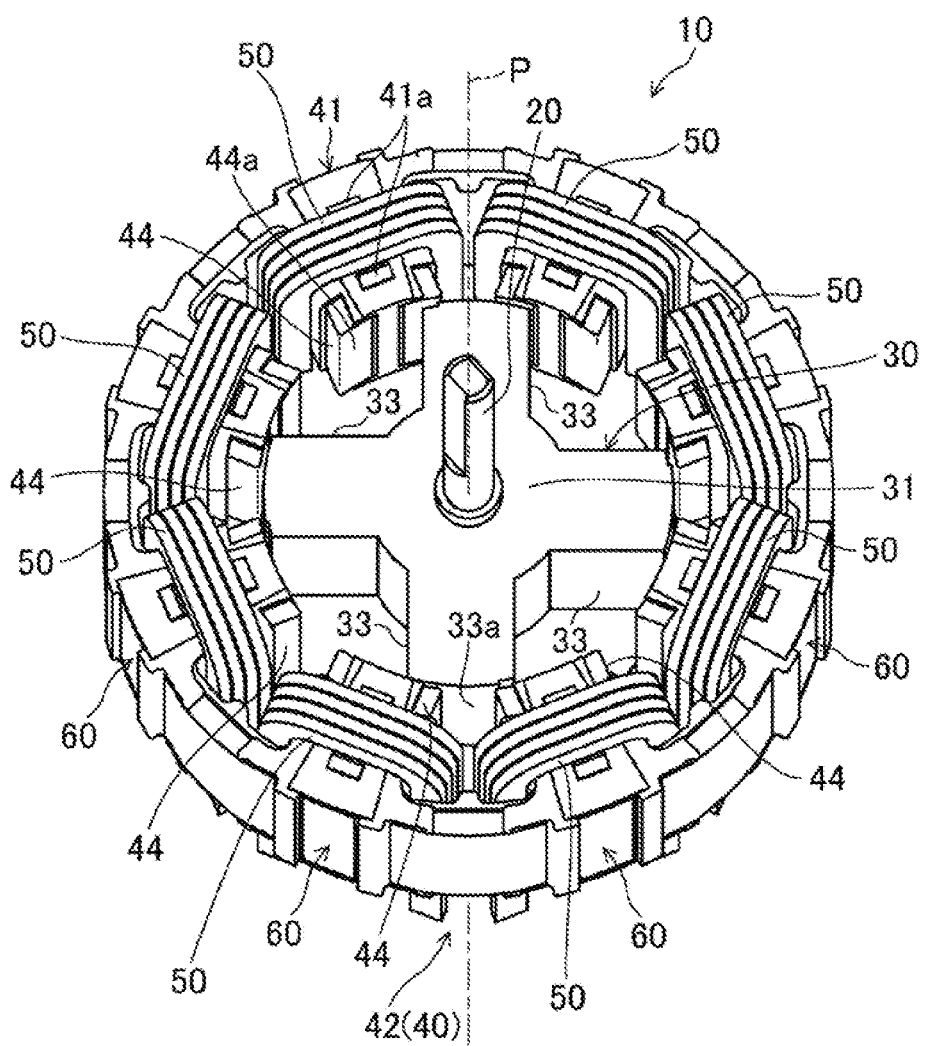
FIG. 8 illustrates a modified example of the flux switching motor according to an embodiment, which is a view corresponding to FIG. 3.

As illustrated in FIG. 8, each of the armature coils 50 of this modified example is configured such that a single-phase alternating current is supplied. That is, in the armature coils 50 of this modified example, there is no distinction such as the A-phase coil and the B-phase coil as in the above embodiment.

In addition, in the rotor 30 of this modified example, four of the rotor teeth 33 are provided unlike the above embodiment. Specifically, the rotor teeth 33 are arranged at regular intervals in the circumferential direction so that each interval forms an angle of 90 degrees. Compared with the above embodiment, in this modified example, because the number of poles of the rotor teeth 33 is reduced, in driving the motor, a switching frequency for switching the energization to the motor coil may be lowered. Accordingly, the processing capability of a microcomputer may be lowered or the switching loss of a power element such as the FET may be reduced. As a result, not only may the manufacturing cost of the motor be suppressed, but also the efficiency of the motor may be increased.

In addition, when the flux switching motor 10 configured by a single-phase alternating current is provided with each of the magnets 60 including the first end 61 and the characteristic configuration of the above embodiment (see FIG. 7), in this modified example, the same effect as in the above embodiment may be obtained.

Other Embodiments

The above embodiment illustrates that the flux switching motor 10 is configured as an inner rotor type, but is not limited thereto. That is, the flux switching motor 10 may be configured as an outer rotor type.

In addition, the above embodiment illustrates a configuration in which the length in the axial direction P from the rotor 30 is shorter than the length in the axial direction P from the stator 40, but is not limited thereto. For example, the length in the axial direction P from the rotor 30 (dimension L1 illustrated in FIG. 7) may be equal to the length in the axial direction P from the stator 40 (dimension L2 illustrated in FIG. 7). In this configuration, the same effect as in the above embodiment may also be obtained. That is, the rotor 30 may be configured such that the length in the axial direction P is equal to or less than the length in the axial direction P from the stator 40.

In addition, the above embodiment illustrates that each of the magnets 60 is formed of the anisotropic Sm—Fe—N bonded magnet configured to contain the resin content of 40% or more by volume percent, but is not limited thereto.

In addition, the above embodiment illustrates that the stator core 42 includes the plurality of split stators 43, but is not limited thereto. That is, the stator core 42 may be configured such that the split stators 43 are integrally formed.

As described above, an embodiment of the present disclosure has been described, but the present disclosure is not limited to the above-described embodiment, and various changes are possible within the scope of the present disclosure.

The present disclosure relates to a flux switching motor capable of being mounted on a battery-powered cleaner such as a cordless type stick cleaner, a fan motor using the same, and the battery-powered cleaner having the same, which may be used in industry.

The invention claimed is:

1. A cleaner comprising:
a flux switching motor,
wherein the flux switching motor comprises:
   a rotating shaft;
   a rotor rotatable around the rotating shaft and comprising a plurality of rotor teeth; and
   a stator positioned to surround the rotor and comprising:
     a plurality of stator teeth provided to face the plurality of rotor teeth with an air gap therebetween;
     a plurality of armature slots and a plurality of field magnet slots alternately arranged in a circumferential direction with respect to the rotating shaft;
     a plurality of magnets, each of the plurality of magnets disposed in a respective filed slot of the plurality of field magnet slots; and
     a plurality of armature coils, each armature coil provided to be wound on armature slots adjacent to a field magnet slot to surround a magnet in the field magnet slot, and
wherein the stator is provided such that a length of the stator in an axial direction in which the rotating shaft extends is shorter than a length of the magnet in the axial direction,
wherein the rotor is provided such that a length of the rotor in the axial direction is less than or equal to the length of the stator in the axial direction,
wherein each of the plurality of magnets is provided such that a first end for each of the plurality of magnets is disposed on a side towards the rotor in a radial direction with respect to the rotating shaft and a second end for each of the plurality of magnets is disposed on a side away from the rotor,
wherein a width of the second end for each of the plurality of magnets in the circumferential direction is formed to be longer than a width of the first end for each of the plurality of magnets in the circumferential direction,
wherein a position for the first end of the magnet in the circumferential direction is disposed such that a distance from a rotor tooth to the first end is longer than an end of a stator tooth facing the rotor tooth, and wherein a distance between the rotating shaft and the second end for each of the plurality of magnets is longer than a distance between the rotating shaft and an outer circumferential surface of a stator core.

2. The cleaner according to claim 1, wherein the plurality of magnets is accommodated in the plurality of field magnet slots, respectively, and disposed such that magnetic pole surfaces of magnets on opposing sides of the rotating shaft have a same polarity.

3. The cleaner according to claim 1, comprising:
a pellet formed at an outer edge of the first end of the magnets.

4. The cleaner according to claim 1, wherein the magnet is formed of an anisotropic Sm—Fe—N bonded magnet has a resin content of 40% or more by volume percent.

5. The cleaner according to claim 1, wherein the flux switching motor is configured to have an outer diameter of 100 mm or less and a height of 50 mm or less.

6. The cleaner according to claim 1, wherein:
a number of the rotor teeth is provided to be an even number, and
a number of the armature slots is provided to be an even number.

7. The cleaner according to claim 6, wherein four of the rotor teeth are provided and
arranged at intervals of 90 degrees in the circumferential direction.

8. A flux switching motor comprising:
a rotating shaft;
a rotor rotatable around the rotating shaft and comprising a plurality of rotor teeth;
a stator positioned to surround the rotor and comprising:
a plurality of stator teeth provided to face the plurality of rotor teeth with an air gap therebetween;
a plurality of armature slots and a plurality of field magnet slots alternately arranged in a circumferential direction with respect to the rotating shaft;
a plurality of magnets, each of the plurality of magnets disposed in a respective field magnet slot of the plurality of field magnet slots; and
a plurality of armature coils, each armature coil provided to be wound on armature slots adjacent to a field magnet slot to surround a magnet in the field magnet slot, and
wherein the stator is provided such that a length of the stator in an axial direction in which the rotating shaft extends is shorter than a length of the magnet in the axial direction,
wherein the rotor is provided such that a length of the rotor in the axial direction is less than or equal to the length of the stator in the axial direction,
wherein each of the plurality of magnets is provided such that a first end for each of the plurality of magnets is disposed on a side towards the rotor in a radial direction with respect to the rotating shaft and a second end for each of the plurality of magnets is disposed on a side away from the rotor,
wherein a width of the second end for each of the plurality of magnets in the circumferential direction is formed to be longer than a width of the first end for each of the plurality of magnets in the circumferential direction,
wherein a position for the first end of the magnet in the circumferential direction is disposed such that a distance from a rotor tooth to the first end is longer than an end of a stator tooth facing the rotor tooth, and
wherein a distance between the rotating shaft and the second end for each of the plurality of magnets is longer than a distance between the rotating shaft and an outer circumferential surface of a stator core.

9. The flux switching motor according to claim 8, wherein:
the plurality of magnets is accommodated in the plurality of field magnet slots, respectively, and disposed such that magnetic pole surfaces of magnets on opposing sides of the rotating shaft have a same polarity.

10. The flux switching motor according to claim 8, wherein a pellet is formed at an outer edge of the first end of the magnet.

11. The flux switching motor according to claim 8, wherein the magnet is formed of an anisotropic Sm—Fe—N bonded magnet has a resin content of 40% or more by volume percent.

12. The flux switching motor according to claim 8, wherein:
the flux switching motor is configured to have an outer diameter of 100 mm or less and a height of 50 mm or less.

13. The flux switching motor according to claim 8, wherein:
a number of the rotor teeth is provided to be an even number, and
a number of the armature slots is provided to be an even number.

14. The flux switching motor according to claim 13, wherein four of the rotor teeth are provided and arranged at intervals of 90 degrees in the circumferential direction.

15. The flux switching motor according to claim 8, wherein the stator includes a plurality of split stators, and
each armature slot is positioned between a first protrusion and a second protrusion of a split stator.

16. The cleaner according to claim 1, wherein the stator includes a plurality of split stators, and
each armature slot is positioned between a first protrusion and a second protrusion of a split stator.

* * * * *